United States Patent
Mastronarde

(12) 
(10) Patent No.: US 6,510,472 B1
(45) Date of Patent: Jan. 21, 2003

(54) DUAL INPUT LANE REORDERING DATA BUFFER

(75) Inventor: Josh B. Mastronarde, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/405,503

(22) Filed: Sep. 23, 1999

(51) Int. Cl.[7] .............................................. G06F 13/00
(52) U.S. Cl. ......................................... 710/52; 710/307
(58) Field of Search ..................... 710/52, 307; 712/33

(56) References Cited

U.S. PATENT DOCUMENTS

| | | | | |
|---|---|---|---|---|
| 4,516,201 A | * | 5/1985 | Warren et al. | 709/234 |
| 5,113,369 A | * | 5/1992 | Kinoshita | 710/307 |
| 5,506,995 A | * | 4/1996 | Yoshimoto et al. | 700/3 |
| 5,613,078 A | * | 3/1997 | Kishigami | 710/307 |
| 5,812,798 A | * | 9/1998 | Moyer et al. | 710/307 |
| 5,928,339 A | * | 7/1999 | Nishikawa | 710/23 |
| 5,944,802 A | * | 8/1999 | Bello et al. | 710/52 |
| 5,974,493 A | * | 10/1999 | Okumura et al. | 710/307 |

FOREIGN PATENT DOCUMENTS

| | | | | |
|---|---|---|---|---|
| JP | 10031647 A | * | 2/1998 | G06F/13/28 |
| JP | 11045207 A | * | 2/1999 | G06F/12/04 |

* cited by examiner

*Primary Examiner*—Hong Kim
(74) *Attorney, Agent, or Firm*—Blakely, Sokoloff, Taylor & Zafman LLP

(57) ABSTRACT

A buffer circuit coupling an input bus having a first portion and a second portion to an output bus. Each of the first portion, the second portion, and the output bus carry data of a predetermined width. The buffer circuit comprises a first plurality of registers, a second plurality of registers, an unload counter, and a multiplexer. The first plurality of registers is coupled to store data from the first portion of the input bus. The second plurality of registers is coupled to store data from the second portion of the input bus and from a data order signal. The unload counter provides an unload count that selects one of the first plurality of registers and a corresponding one of the second plurality of registers. The multiplexer provides either the selected one of the first plurality of registers or the corresponding one of the second plurality of registers to the output bus. The multiplexer is responsive to the data order signal stored in the corresponding one of the second plurality of registers.

28 Claims, 4 Drawing Sheets

DUAL INPUT LANE REORDERING DATA BUFFER

BACKGROUND

1. Field

This invention relates to data buffers and, more particularly, to data buffers that connect a wide input bus to a narrow output bus.

2. Background Information

A plurality of digital signals can be presented simultaneously on a plurality of lines making up a parallel bus. In some applications, data may be presented on a wide bus and then transferred to a narrower bus for use by remaining portions the system. For example, a Rambuse® memory controller presents 128 bits of data, 2 quad words, which must be narrowed to 64 bits, one quad word, for use by the remaining portions of the system.

The conversion between a wide input bus and a narrow output bus that is one-half the width of the wider bus is relatively straightforward if the data is presented in a consistent order. Unfortunately, this is not always the case. Consider a system that uses data elements of a given width (number of bits) that are received from a source that can provide data units containing two data elements on a wide input bus. Each data unit consists of a first data element and a second data element. A buffer is required to couple the wide input bus to a narrow output bus of one-half the width of the input bus. The buffer must also interleave the two data elements of each data unit in the correct order.

If the input bus consists of an A lane and a B lane, each lane can present one of the two data elements for a data unit. In one cycle, lane A might present the first data element and lane B lane the second. A later cycle might have a reversed presentation. Thus, the buffer must be capable of selectively interleaving in an "A then B" order and in a "B then A" order. Another possibility is one of the two lanes presenting data with the other lane left unused. The second data element would appear in a later cycle on the other lane. Presentation of the data in two cycles will be termed a non-aligned presentation of the data. It is possible that several non-aligned presentations occur in successive cycles. In the first cycle, the first data element of a first data unit might be presented on the B lane of the input bus. In the following cycle, the second data element of the first data unit could be presented on the A lane of the input bus. Simultaneously, the first data element of a second unit could be presented on the B lane of the input bus. This could continue until a cycle in which one data element is presented, which would be the second data unit and which would appear on the A lane of the input bus. Table 1 shows the possible data presentations. Idle cycles where no data is presented can occur between any two active cycles of any form of presentation. The desired order on the output bus is first element of first unit, second element of first unit, first element of second unit, and so on. The buffer that connects the wide input bus to the narrow output bus must receive any of five types of input cycles and produce the desired order on the output bus.

TABLE 1

| Cycle | Lane A | Lane B | Presentation |
| --- | --- | --- | --- |
| 1 | First element of first unit | Second element of first unit | aligned |
| 2 | Second element of second unit | First element of second unit | reversed |
| 3 | First element of third unit | unused | non-aligned |
| 4 | unused | Second element of third unit | |
| 5 | unused | First element of fourth unit | non-aligned |
| 6 | Second element of fourth unit | unused | reversed |
| 7 | First element of fifth unit | unused | non-aligned |
| 8 | First element of sixth unit | Second element of fifth unit | |
| 9 | unused | Second element of sixth unit | |
| 10 | unused | First element of seventh unit | non-aligned |
| 11 | Second element of seventh unit | First element of eighth unit | reversed |
| 12 | Second element of eighth unit | unused | |
| 13 | unused | unused | idle |

One way to accomplish this would be to reorder data received on the input bus necessary so that all the data elements are buffered as required by the output bus. However, this requires a two to one multiplexer for every line of the wide input bus connected to selectively exchange the two halves of the input bus. For a very wide input bus the number of circuits required can be substantial. Accordingly, what is required is a method and apparatus for receiving data units on a wide input bus with varying data element orders, buffering the data, and correctly presenting the data elements on a narrow output bus without requiring a multiplexer for every line of the input bus.

SUMMARY

A buffer circuit coupling an input bus having a first portion and a second portion to an output bus. Each of the first portion, the second portion, and the output bus carry data of a predetermined width. The buffer circuit comprises a first plurality of registers, a second plurality of registers, an unload counter, and a multiplexer. The first plurality of registers is coupled to store data from the first portion of the input bus. The second plurality of registers is coupled to store data from the second portion of the input bus and from a data order signal. The unload counter provides an unload count that selects one of the first plurality of registers and a corresponding one of the second plurality of registers. The multiplexer provides either the selected one of the first plurality of registers or the corresponding one of the second plurality of registers to the output bus. The multiplexer is responsive to the data order signal stored in the corresponding one of the second plurality of registers.

DETAILED DESCRIPTION

The present invention provides a buffering mechanism that can receive data units on a wide input bus in a variety of data presentations and reorder the data elements of each data unit as required to present the data units on a narrow output bus in the correct order. This is accomplished without the use of multiplexers on the input bus lines.

Figure 1:
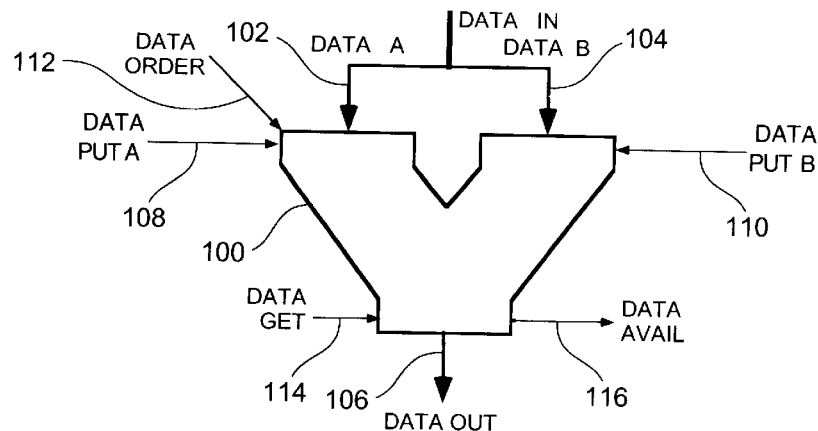
FIG. 1 is a schematic representation of a generalized embodiment of the present invention.

FIG. 1 is a schematic representation of a generalized embodiment of the present invention. A buffer 100 receives data on an input bus that includes an A lane 102 and a B lane 104. Each lane can present one data element. The buffer 100 supplies data on an output bus 106 that can present one element. Thus, the input bus is twice as wide as the output bus. There are three control signals that control the receiving of data by the buffer. DATA PUT A 108 is a clock signal indicating that a data element is being presented to the buffer 100 on the A lane 102. Likewise, DATA PUT B 110 indicates data being presented on the B lane 104. DATA ORDER 112 indicates to the buffer 100 whether the data is being presented in reversed order. Two control signals control the supplying of data by the buffer. The buffer 100 produces DATA AVAIL 116 to indicate whether or not the buffer is empty. When the buffer is not empty, DATA AVAIL 116 is asserted indicating that valid data is present on the output bus 106. When the receiving system retrieves a data unit from the buffer 100, DATA GET 114 is pulsed to cause the buffer 100 to present the next data unit on the output bus 106.

Figure 2:
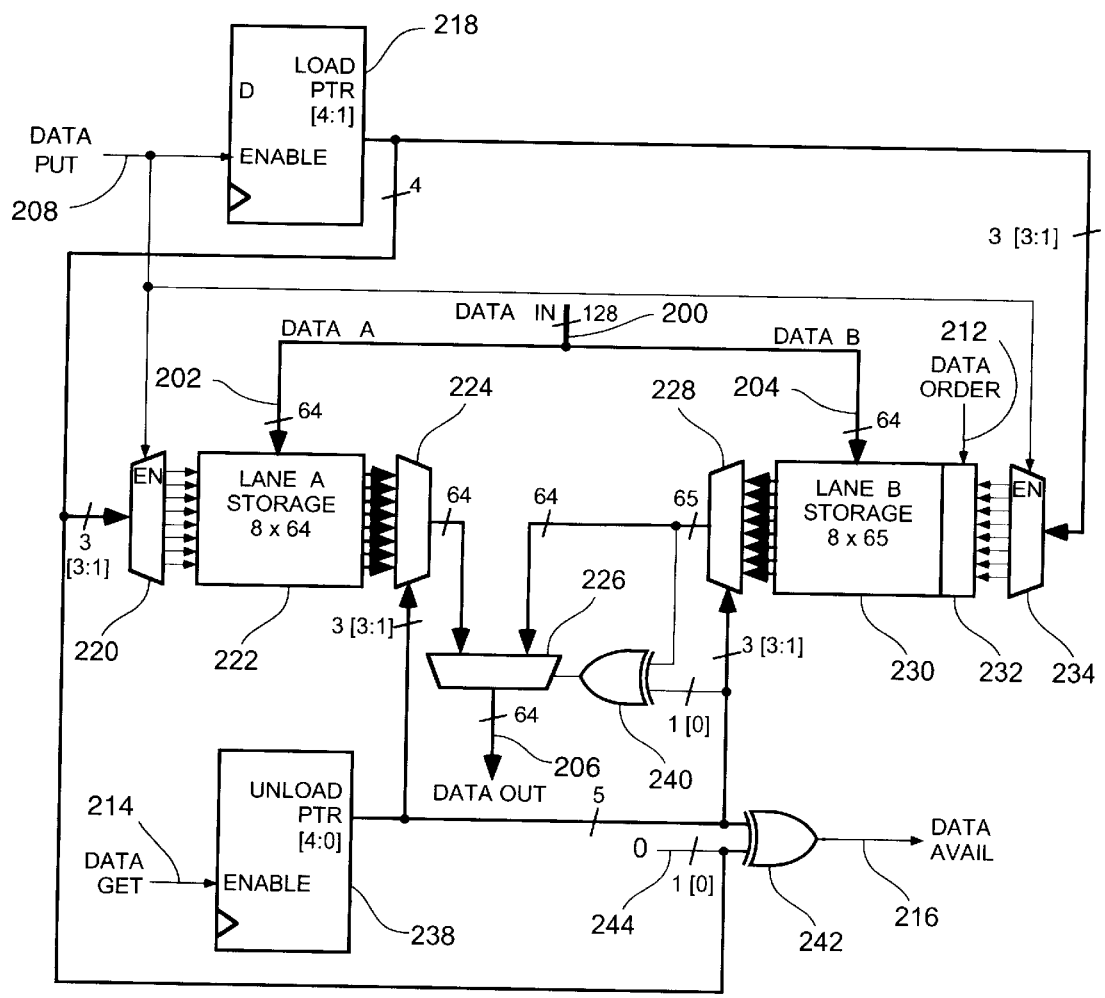
FIG. 2 is an exemplary circuit that illustrates one embodiment of the invention.

FIG. 2 shows an exemplary circuit for the buffer 100 embodying the present invention. This buffer connects a 128 bit input bus 200 to a 64 bit output bus 206. The input bus 200 is divided into two 64 bit lanes, lane A 202 and lane B 204. The embodiment shown can buffer aligned presentations which may be reversed. Table 2 shows the input presentations that are allowable for this circuit.

TABLE 2

| Cycle | Lane A | Lane B | DATA ORDER |
|---|---|---|---|
| 1 | First element of first unit | Second element of first unit | normal |
| 2 | Second element of second unit | First element of second unit | reversed |
| 3 | unused | unused | — |

Since the circuit of this embodiment does not support input on only one of the two data lanes, a single DATA PUT 208 controls the presentation of data on both lanes simultaneously. The DATA ORDER 212 signal indicates whether the presentation is reversed, as in cycle 2 in Table 2. This embodiment provides DATA AVAIL 216 and receives DATA GET 214, both of which function as previously described.

A file of registers 222, 230 provides buffer storage for each lane of input. In the embodiment shown, 8 registers are used in each lane. It will be obvious that the number of registers can be increased or decreased as required by a particular application of the invention. The data lanes 202, 204 are coupled to the inputs of all registers in their respective storage units 222, 230. A counter 218 generates a LOAD PTR that selects a register, or row, within the storage unit. In the embodiment shown, 3 bits are used to select 1 of 8 rows to store the input data. A 3 to 8 decoder 220, 234 enabled by the DATA PUT signal 208 provides an enable signal to a row of the storage 222, 230 causing the data on the input bus to be stored in the selected row. The DATA PUT signal 208 also causes the counter 218 to increment LOAD PTR so that the next data unit presented on the input bus will be stored in the next row of the storage unit with a wraparound between the first and last rows. Thus, the lane storage units function as circular queues for the data elements.

The DATA ORDER control signal 212 indicates whether data is presented in reversed order. A one bit file is used to store this flag bit for each row of storage. In the embodiment shown, 8 bits are used which provided as a one bit extension 232 to each row of lane B storage 230. The storing of the DATA ORDER bit operates in the same manner as the storing of the data unit described above.

The unloading of the lane storage to provide data elements on the DATA OUT bus 206 is controlled by a second counter 238 that produces an UNLOAD PTR. Three bits from the UNLOAD PTR are used to select the data from one of the eight rows of lane storage 222, 230 using 1 of 8 data selectors 224, 228. The UNLOAD PTR includes an additional low order bit that selects a data element from one of the two data selectors using a 2 to 1 multiplexer 226. The low order bit of UNLOAD PTR is selectively inverted by an exclusive-OR gate 240 in response to the DATA ORDER flag stored on the row providing the two data elements to the multiplexer 226. In this way, data units can be presented on the output bus 206 from lane A then lane B or from lane B then lane A in response to the DATA ORDER flag. This allows reversing the order of data elements using half the number of 2 to 1 multiplexers as would be required if data elements were reversed by multiplexers on the input bus.

Exclusive-OR gates 242 are used to compare LOAD PTR and UNLOAD PTR to generate the DATA AVAIL signal. Both LOAD PTR and UNLOAD PTR include a high order bit that is used only in the comparison to prevent false matches when the storage units 222, 230 are full. A low order bit 244 that is always zero is concatenated with LOAD PTR for comparison with the low order lane selection bit of UNLOAD PTR that is not present in this embodiment of LOAD PTR.

Figure 3:
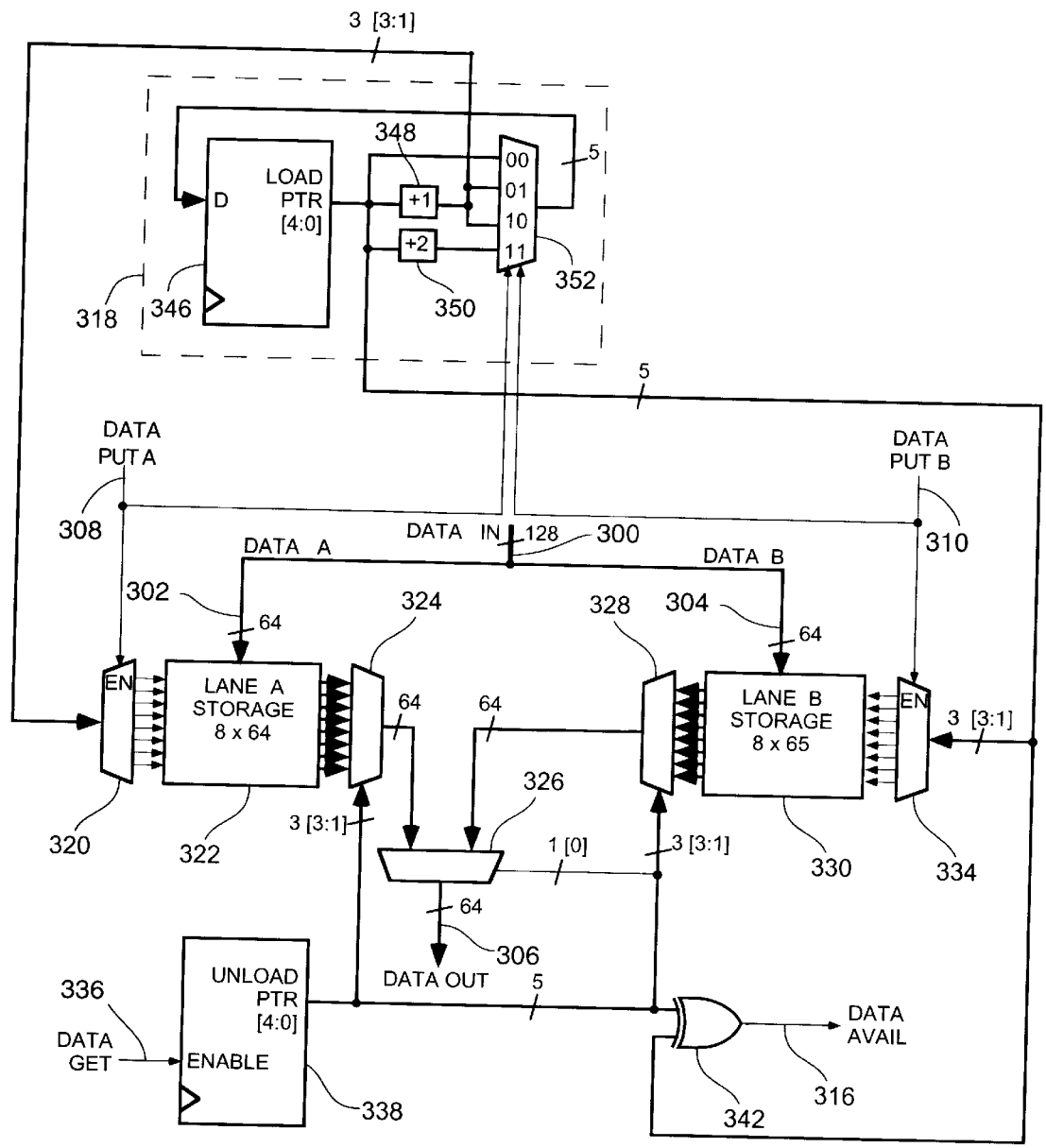
FIG. 3 is a second exemplary circuit that illustrates another embodiment of the invention.

FIG. 3 shows another exemplary circuit for the buffer 100 embodying the present invention. This embodiment is capable of receiving non-aligned presentations. Since the circuit of this embodiment does support input on only one of the two data lanes as well as on both lanes simultaneously, the circuit uses DATA PUT A 308 and DATA PUT B 310 to control the presentation of data on each lane individually. This embodiment does not support reversed presentations and no DATA ORDER control signal is used. This embodiment provides DATA AVAIL 316 and receives DATA GET 314, both of which function as previously described. Table 3 shows the data presentations allowable for this embodiment of the invention.

TABLE 3

| Cycle | Lane A | Lane B | LOAD PTR [3:1] | [0] |
|---|---|---|---|---|
| 1 | First element of first unit | Second element of first unit | 0 | 0 |
| 2 | First element of second unit | unused | 1 | 0 |
| 3 | unused | Second element of second unit | 1 | 1 |
| 4 | First element of third unit | unused | 2 | 0 |
| 5 | First element of fourth unit | Second element of third unit | 2 | 1 |
| 6 | unused | Second element of fourth unit | 3 | 1 |
| 7 | unused | unused | 4 | 0 |
| 8 | First element of fifth unit | Second element of fifth unit | 4 | 0 |

A file of registers 322, 330 provides buffer storage for each lane of input as described for the previous embodiment. A counter 318 generates a LOAD PTR that selects a register, or row, within the storage unit. In this embodiment, the counter 318 includes features to allow handling of non-aligned input of data units. The counter 318 includes flip flops 346 that hold the value of LOAD PTR. The output of the flip flops is coupled to an increment by one unit 348 and an increment by two unit 350. The increment by one unit 348 generates (LOAD PTR+1). The generates increment by two unit 350 (LOAD PTR+2). A one of four data selector 352 selects from LOAD PTR, (LOAD PTR+1), and (LOAD PTR+2) in response to DATA PUT A 308 and DATA PUT B 310. Thus, the counter is incremented in cycles when DATA PUT A or DATA PUT B are asserted, being incremented by one if only one of the two are asserted, and being incremented by two if both are asserted. Of course, if neither DATA PUT A or DATA PUT B is asserted, then the output of the flip flops 346 is fed back to the input and LOAD PTR is not incremented.

The counter 318 includes a low order bit, LOAD PTR [0], that is not used for selecting data rows. The lane B row select uses bits 3 through 1 of the unincremented counter output, LOAD PTR [3:1]. The lane A row select uses bits 3 through 1 of the incremented by one counter output, (LOAD PTR+1) [3:1]. The operation LOAD PTR to process non-aligned presentation of data units is best understood with reference to Table 3. In this embodiment, LOAD PTR [0] will be 0 whenever the first element of a data unit is presented.

As shown in cycle 1 in Table 3, the first unit is an aligned presentation that would be stored in row 0. It will be appreciated that row for the first element of the first unit is selected by (LOAD PTR+1) which has the value 1. The first element is stored in lane A of row 0 because the low order bit is not used to select the storage row. LOAD PTR is then incremented by 2 because both DATA PUT A and DATA PUT B are asserted.

Cycle 2 is the first cycle in a non-aligned presentation of one data unit. In cycle 2, the first element of the second unit is stored in lane A of row 1. LOAD PTR is then incremented by 1 because only DATA PUT A is asserted. In cycle 3, the second element of the second unit is stored in lane B of row 1. LOAD PTR is incremented by 1 because only DATA PUT B is asserted. This leaves LOAD PTR [3:1] pointing to the next row of storage and LOAD PTR [0] equal to 0. The buffer is therefore ready to receive the first data element of the next data unit.

Cycle 4 is the first cycle in a burst of non-aligned presentations. In cycle 4, the first element of the third unit is stored in lane A of row 2. LOAD PTR is then incremented by 1 because only DATA PUT A is asserted. In cycle 5, the second element of the third unit is stored in lane B of row 2 because the low order bit of LOAD PTR, which is now 1, is not used to select the row for lane B. Also in cycle 5, the first element of the fourth unit is stored in lane A of row 3 because (LOAD PTR+1) [3:1] is used to select the row for lane A; (LOAD PTR+1) [3:1] now points to the row following the row pointed to by LOAD PTR [3:1] since LOAD PTR[0] is 1. It will be appreciated that cycle 5 can be repeated indefinitely to create a burst of any length. In cycle 6, the second element of the fourth unit is stored in lane B of row 3. LOAD PTR is incremented by 1 because only DATA PUT B is asserted leaving the buffer in a condition to receive the first data element of the next data unit.

As shown by cycle 7, LOAD PTR is not incremented in idle cycles when no data is presented. Idle cycles may be inserted following any other cycle. For example, an idle cycle could occur between cycles 5 and 6 without affecting the proper processing of the data elements.

Unloading of the lane storage to provide data elements on the DATA OUT bus 306 is controlled by a second counter 338 that produces an UNLOAD PTR as was described for the previous embodiment. Since there is no DATA ORDER flag used in this embodiment, the low order bit UNLOAD PTR [0] is used directly to select between lane A and lane B.

DATA AVAIL is generated as described for the previous embodiment except that LOAD PTR and UNLOAD PTR have the same number of bits and it is not necessary to concatenate a low order bit to LOAD PTR for the comparison of the pointers.

Figure 4:
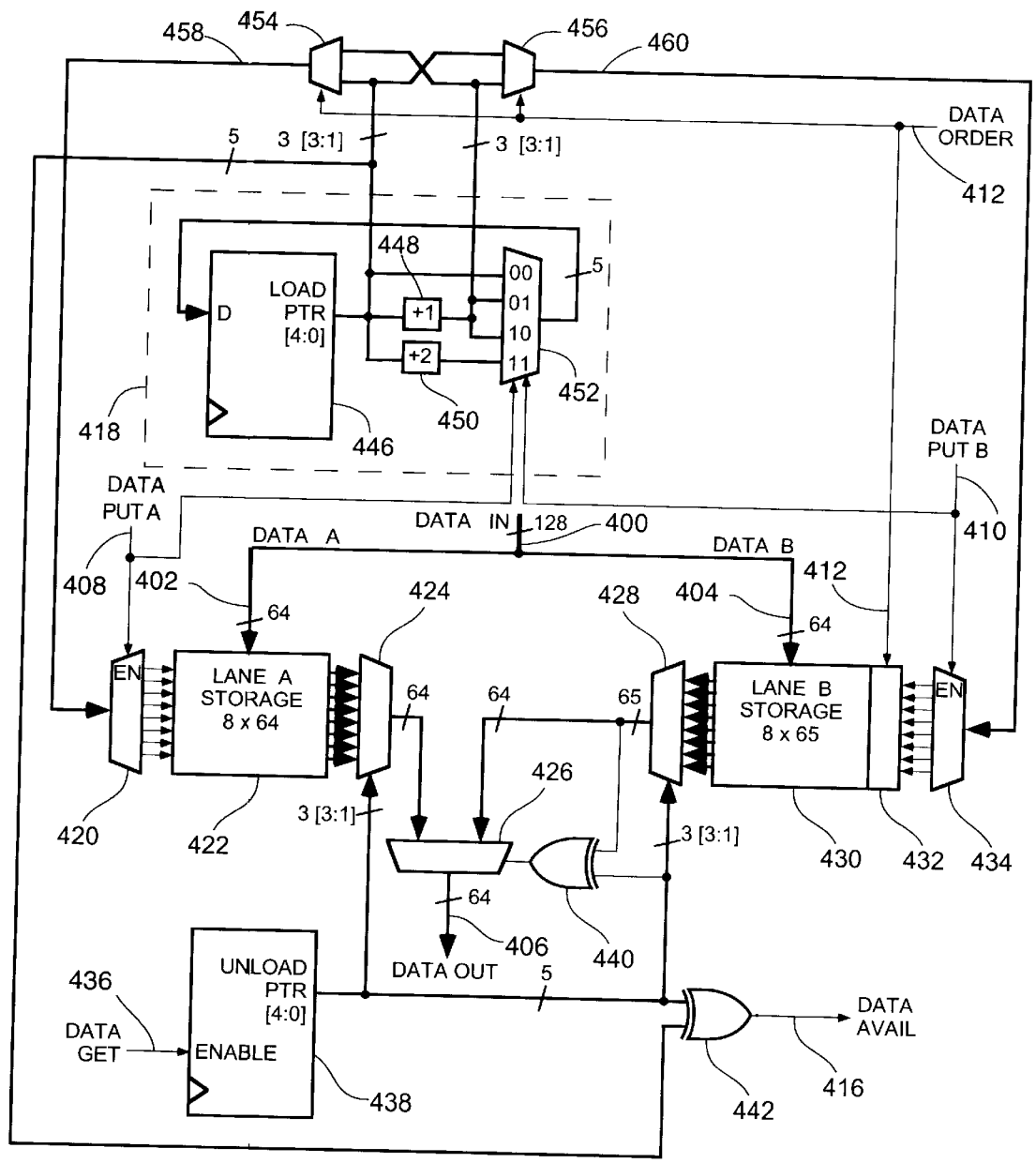
FIG. 4 is a third exemplary circuit that illustrates another embodiment of the invention.

FIG. 4 shows another exemplary circuit for a buffer that embodies the present invention. This embodiment combines the capability for accepting reversed presentations of the embodiment shown in FIG. 2 and the capability for accepting non-aligned presentations of the embodiment shown in FIG. 3. In this embodiment, the DATA ORDER flag storage 432 feature is provided to handle reversed presentations. This aspect of the circuit functions in the same way as the embodiment of FIG. 2 described above.

The counter 418 functions in the same way as the embodiment of FIG. 3 described above to handle non aligned presentations. Reversed non-aligned presentations require that two multiplexers 454, 456 be added. The multiplexers are controlled by the DATA ORDER control signal 412. When the data is not reversed, the lane B multiplexer 456 couples LOAD PTR [3:1] to the lane B decoder 434 to select the row for lane B storage 430 and the lane A multiplexer 454 couples (LOAD PTR+1) [3:1] to the lane A decoder 420 to select the row for lane a storage 422. When the data is reversed, the lane B multiplexer 456 couples (LOAD PTR+1) [3:1] to the lane B decoder 434 to select the row for lane B storage 430 and the lane A multiplexer 454 couples LOAD PTR [3:1] to the lane A decoder 420 to select the row for lane a storage 422. Thus, the row of lane storage that receives the first data element of the data unit is always selected by (LOAD PTR+1) [3:1]. In all other respects, the embodiment shown in FIG. 4 functions in the same way as the embodiments shown in FIGS. 2 and 3.

Figure 5:
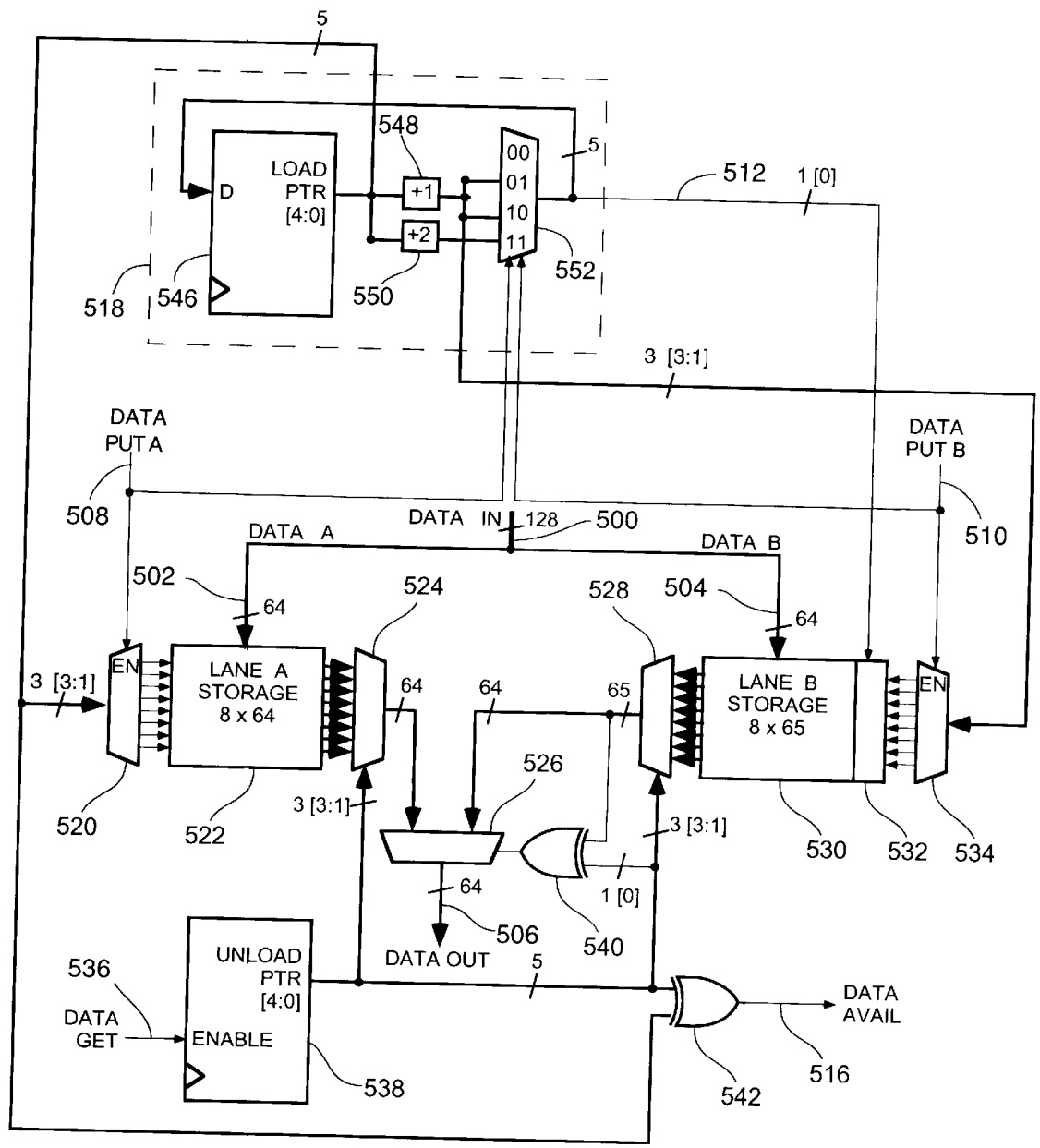
FIG. 5 is a fourth exemplary circuit that illustrates another embodiment of the invention.

FIG. 5 shows another exemplary circuit for a buffer that embodies the present invention. This embodiment handles the useful case where data units are either aligned or reversed non-aligned. Table 4 shows the data presentations handled by this embodiment.

TABLE 4

| Cycle | Lane A | Lane B | LOAD PTR [3:1] | [0] |
|---|---|---|---|---|
| 1 | First element of first unit | Second element of first unit | 0 | 0 |
| 2 | unused | First element of second unit | 1 | 0 |
| 3 | Second element of second unit | unused | 1 | 1 |
| 4 | unused | First element of third unit | 2 | 0 |
| 5 | Second element of third unit | First element of fourth unit | 2 | 1 |
| 6 | unused | Second element of fourth unit | 3 | 1 |
| 7 | unused | unused | 4 | 0 |
| 8 | First element of fifth unit | Second element of fifth unit | 4 | 0 |

In this embodiment, the lane B decoder 534 receives (LOAD PTR+1) [3:1] directly to select the row for lane B storage 530 and the lane A decoder 520 receives LOAD PTR [3:1] directly to select the row for lane a storage 522. It is possible to eliminate the multiplexers for the decoder inputs because the non-aligned presentations are always reversed and the order of the decoder inputs does not matter for aligned presentations.

It may be observed that for this embodiment, the low order bit 512 of the output of the counter data selector 552 will always be 1 when lane B is stored if the data order is reversed. For example, in cycle 2 LOAD PTR [0] is 0 and increment by one will be chosen since only DATA PUT B 510 is asserted. In cycle 5 LOAD PTR [0] is 1 and increment by two will be chosen since both DATA PUT A 508 and DATA PUT B 510 are asserted. Conversely, the low order bit of the output of the counter data selector 552 will always be 0 when lane B is stored if the data order is not reversed. Therefore, the low order bit 512 of the output of the counter data selector 552 can be stored as the DATA ORDER flag in the extension 532 of the lane B storage 530 and a separate DATA. ORDER input is not required in this embodiment. In all other respects, this embodiment is substantially similar to the preceding embodiments.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. In particular, the invention is not limited to any specific data width and may be adapted to any use where it is desired to transfer data to an output bus from an input bus of twice the width of the output bus, as will be readily understood by those of ordinary skill in the art.

What is claimed is:

1. A buffer circuit coupling an input bus having a first portion and a second portion to an output bus, each of the first portion, the second portion, and the output bus carrying data of a predetermined width, the buffer circuit comprising:

a first plurality of registers coupled to store data from the first portion of the input bus;

a second plurality of registers coupled to store data from the second portion of the input bus and from a data order signal;

an unload counter that provides an unload count that selects one of the first plurality of registers and a corresponding one of the second plurality of registers; and a multiplexer that provides either the selected one of the first plurality of registers or the corresponding one of the second plurality of registers to the output bus, the multiplexer responsive to the data order signal stored in the corresponding one of the second plurality of registers.

2. The buffer circuit of claim 1 further comprising:

a load counter that provides a load count that is incremented by one if one of a first control signal or a second control signal is asserted, incremented by two if both the first control signal and the second control signal are asserted, and not incremented if neither the first control signal nor the second control signal are asserted;

the first plurality of registers storing data responsive to the first control signal, the data being stored in one of the first plurality of registers responsive to the load count; and the second plurality of registers storing data responsive to the second control signal, the data being stored in one of the second plurality of registers responsive to the load count.

3. The buffer circuit of claim 2 wherein the load counter further comprises:

a register having an input and an output to hold the load count;

an increment by one unit with an output and an input coupled to the register output;

an increment by two unit with an output and an input coupled to the register output; and a data selector with a plurality of inputs coupled to the register output, the increment by one unit output, and the increment by two unit output, and an output coupled to the input of the register, the output being coupled to one of the plurality of inputs responsive to the first control signal and the second control signal.

4. The buffer circuit of claim 3 wherein the low order bit of the output of the data selector provides the data order signal.

5. The buffer circuit of claim 2 wherein:

the data is stored in one of the first plurality of registers selected by the load count incremented by one and divided by two; and the data is stored in one of the second plurality of registers selected by the load count divided by two.

6. The buffer circuit of claim 2 further comprising a selector circuit having a first input that receives the load count divided by two, a second input that receives the load count incremented by one and divided by two, a first output coupled to the first plurality of registers, a second output coupled to the second plurality of registers, and a control input that receives the data order signal, the first input being coupled to the first output and the second input being coupled to the second output if the data order signal is not asserted, and, the first input being coupled to the second output and the second input being coupled to the first output if the data order signal is asserted.

7. The buffer circuit of claim 1 further comprising an exclusive-OR gate that receives the data order signal stored in the corresponding one of the second plurality of registers and the low order bit of the unload count and provides a signal to the multiplexer.

8. A buffer circuit coupling an input bus having a first portion and a second portion to an output bus, each of the first portion, the second portion, and the output bus carrying data of a predetermined width, the buffer circuit comprising:

a load counter that provides a load count that is incremented by one if one of a first control signal or a second control signal is asserted, incremented by two if both the first control signal and the second control signal are asserted, and not incremented if neither the first control signal nor the second control signal are asserted;

a first plurality of registers coupled to store data from the first portion of the input bus responsive to the first control signal, the data being stored in one of the first plurality of registers responsive to the load count; and a second plurality of registers coupled to store data from the second portion of the input bus responsive to the second control signal, the data being stored in one of the second plurality of registers responsive to the load count.

9. The buffer circuit of claim 8 wherein the load counter further comprises:

a register having an input and an output to hold the load count;

an increment by one unit with an output and an input coupled to the register output;

an increment by two unit with an output and an input coupled to the register output; and a data selector with a plurality of inputs coupled to the register output, the increment by one unit output, and the increment by two unit output, and an output coupled to the input of the register, the output being coupled to one of the plurality of inputs responsive to the first control signal and the second control signal.

10. The buffer circuit of claim 8 wherein:

the data is stored in one of the first plurality of registers selected by the load count incremented by one and divided by two; and the data is stored in one of the second plurality of registers selected by the load count divided by two.

11. A buffer circuit coupling an input bus having a first portion and a second portion to an output bus, each of the first portion, the second portion, and the output bus carrying data of a predetermined width, the buffer circuit comprising:

first means for storing data from the first portion of the input bus;

second means for storing data from the second portion of the input bus and from a data order signal;

third means for selecting a first data element from the first means and a corresponding second data element from the second means; and fourth means for providing either the first data element or the corresponding second data element to the output bus, the fourth means responsive to the data order signal stored with the corresponding second data element.

12. The buffer circuit of claim 11 further comprising:

fifth means for incrementing a load count by one if one of a first control signal or a second control signal is asserted, incrementing the load count by two if both the first control signal and the second control signal are asserted, and not incrementing the load count if neither the first control signal nor the second control signal are asserted;

the first means storing data from the first portion of the input bus in a first means location responsive to the load count; and the second means storing data from the second portion of the input bus in a second means location responsive to the load count.

13. The buffer circuit of claim 12 wherein the fifth means further comprises:

sixth means that holds the load count;

seventh means to receive the load count from the sixth means and provide the load count incremented by one;

eighth means to receive the load count from the sixth means and provide the load count incremented by two;

ninth means to provide one of the load count, the load count incremented by one, or the load count incremented by two, to the sixth means, the ninth means being responsive to the first control signal and the second control signal.

14. The buffer circuit of claim 13 wherein the eleventh means further provides the data order signal.

15. The buffer circuit of claim 12 wherein:

the data is stored in the first means location selected by the load count incremented by one and divided by two; and the data is stored in the second means location selected by the load count divided by two.

16. The buffer circuit of claim 12 further comprising sixth means having a first input that receives the load count divided by two, a second input that receives the load count incremented by one and divided by two, a first output coupled to the first means, a second output coupled to the second means, and a control input that receives the data order signal, the first input being coupled to the first output and the second input being coupled to the second output if the data order signal is not asserted, and, the first input being coupled to the second output and the second input being coupled to the first output if the data order signal is asserted.

17. The buffer circuit of claim 11 further comprising fifth means that selectively complements the data order signal stored with the corresponding second data element responsive to the low order bit of the unload count and provides the selectively complemented data order signal to the fourth means.

18. A buffer circuit coupling an input bus having a first portion and a second portion to an output bus, each of the first portion, the second portion, and the output bus carrying data of a predetermined width, the buffer circuit comprising:

first means for incrementing a load count by one if one of a first control signal or a second control signal is asserted, incrementing the load count by two if both the first control signal and the second control signal are asserted, and not incrementing the load count if neither the first control signal nor the second control signal are asserted;

second means for storing data from the first portion of the input bus responsive to the first control signal, the data being stored in a second means location responsive to the load count; and third means for storing data from the second portion of the input bus responsive to the second control signal, the data being stored in a third means location responsive to the load count.

19. The buffer circuit of claim 18 wherein the first means further comprises:

fourth means that holds the load count;

fifth means to receive the load count from the fourth means and provide the load count incremented by one;

sixth means to receive the load count from the fourth means and provide the load count incremented by two;

seventh means to provide one of the load count, the load count incremented by one, or the load count incremented by two, to the fourth means, the seventh means being responsive to the first control signal and the second control signal.

20. The buffer circuit of claim 18 wherein:

the data is stored in the second means location selected by the load count incremented by one and divided by two; and the data is stored in the third means location selected by the load count divided by two.

21. A data bus system comprising:

an input bus having a first portion and a second portion, each of the first portion and the second portion carrying data of a predetermined width;

an output bus carrying data of the predetermined width; and a buffer circuit coupled to the input bus and the output bus, the buffer circuit including a first plurality of registers coupled to store data from the first portion of the input bus;

a second plurality of registers coupled to store data from the second portion of the input bus and from a data order signal;

an unload counter that provides an unload count that selects one of the first plurality of registers and a corresponding one of the second plurality of registers; and a multiplexer that provides either the selected one of the first plurality of registers or the corresponding one of the second plurality of registers to the output bus, the multiplexer according to the data order signal stored in the corresponding one of the second plurality of registers.

22. The data bus system of claim 21 further comprising:

a load counter that provides a load count that is incremented by one if one of a first control signal or a second control signal is asserted, incremented by two if both the first control signal and the second control signal are asserted, and not incremented if neither the first control signal nor the second control signal are asserted;

the first plurality of registers storing data according to the first control signal, the data being stored in one of the first plurality of registers according to the load count; and the second plurality of registers storing data according to the second control signal, the data being stored in one of the second plurality of registers according to the load count.

23. The data bus system of claim 22 wherein the load counter further comprises:

a register having an input and an output to hold the load count;

an increment by one unit with an output and an input coupled to the register output;

an increment by two unit with an output and an input coupled to the register output; and a data selector with a plurality of inputs coupled to the register output, the increment by one unit output, and the increment by two unit output, and an output coupled to the input of the register, the output being coupled to one of the plurality of inputs according to the first control signal and the second control signal.

24. The data bus system of claim 23 wherein the low order bit of the output of the data selector provides the data order signal.

25. The data bus system of claim 22 wherein:

the data is stored in one of the first plurality of registers selected by the load count incremented by one and divided by two; and the data is stored in one of the second plurality of registers selected by the load count divided by two.

26. The data bus system of claim 22 further comprising a selector circuit having a first input that receives the load count divided by two, a second input that receives the load count incremented by one and divided by two, a first output coupled to the first plurality of registers, a second output coupled to the second plurality of registers, and a control input that receives the data order signal, the first input being coupled to the first output and the second input being coupled to the second output if the data order signal is not asserted, and, the first input being coupled to the second output and the second input being coupled to the first output if the data order signal is asserted.

27. The data bus system of claim 21 further comprising an exclusive-OR gate that receives the data order signal stored in the corresponding one of the second plurality of registers and the low order bit of the unload count and provides a signal to the multiplexer.

28. The data bus system of claim 21 further comprising a circuit board to support the input bus, the output bus, and the buffer circuit.

* * * * *

UNITED STATES PATENT AND TRADEMARK OFFICE
CERTIFICATE OF CORRECTION

PATENT NO. : 6,510,472 B1 Page 1 of 1
DATED : January 21, 2003
INVENTOR(S) : Mastronarde It is certified that error appears in the above-identified patent and that said Letters Patent is hereby corrected as shown below:

Column 2,
Line 2, before "necessary", insert -- as --.

Signed and Sealed this

Seventeenth Day of June, 2003

JAMES E. ROGAN
*Director of the United States Patent and Trademark Office*